US011105051B2

(12) United States Patent
Engelmann et al.

(10) Patent No.: US 11,105,051 B2
(45) Date of Patent: Aug. 31, 2021

(54) INCLINATION CONTROL FOR CONSTRUCTION MACHINES

(71) Applicants: Caterpillar Paving Products Inc., Brooklyn Park, MN (US); Caterpillar Trimble Control Technologies LLC, Dayton, OH (US)

(72) Inventors: Eric S. Engelmann, Delano, MN (US); Mark A. Tarvin, Canton, IL (US); Conwell K. Rife, Jr., Wayzata, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 16/654,994

(22) Filed: Oct. 16, 2019

(65) Prior Publication Data

US 2020/0123716 A1 Apr. 23, 2020

Related U.S. Application Data

(60) Provisional application No. 62/749,571, filed on Oct. 23, 2018.

(51) Int. Cl.
| | | |
|---|---|---|
| *E01C 23/088* | (2006.01) | |
| *E01C 23/12* | (2006.01) | |
| *B62D 55/065* | (2006.01) | |
| *B62D 55/084* | (2006.01) | |
| *B62D 55/116* | (2006.01) | |

(52) U.S. Cl.
CPC .......... *E01C 23/088* (2013.01); *E01C 23/127* (2013.01); *B62D 55/065* (2013.01); *B62D 55/084* (2013.01); *B62D 55/116* (2013.01)

(58) Field of Classification Search
CPC ... E01C 23/088; E01C 23/127; B62D 55/065; B62D 55/084; G05D 1/0891
See application file for complete search history.

(56) References Cited

U.S. PATENT DOCUMENTS

| | | |
|---|---|---|
| 3,029,716 A | 4/1962 | Shea |
| 5,906,655 A | 5/1999 | Fan |
| 9,656,530 B2 | 5/2017 | Busley et al. |
| 9,879,390 B2 | 1/2018 | Berning et al. |
| 9,956,842 B2 | 5/2018 | Muir et al. |

(Continued)

FOREIGN PATENT DOCUMENTS

| | | |
|---|---|---|
| CN | 108643274 | 10/2018 |
| EP | 0547378 | 6/1993 |

OTHER PUBLICATIONS

Machine translation of EP0547378 dated Oct. 2020.*

*Primary Examiner* — Janine M Kreck
(74) *Attorney, Agent, or Firm* — Schwegman, Lundberg & Woessner

(57) ABSTRACT

A system may include a first transportation device, a controller, and an inclination control system. The controller can control a construction machine including the first transportation device, which can move the construction machine over an operating surface. The inclination control system includes first and second slope sensors. The first slope sensor is coupled to the first transportation device and the second slope sensor is coupled to the construction machine. The controller controls the construction machine based on inclination information received from the inclination control system.

20 Claims, 3 Drawing Sheets

(56) References Cited

U.S. PATENT DOCUMENTS

| | | | |
|---|---|---|---|
| 10,011,974 B2 | 7/2018 | Zhang et al. | |
| 2012/0301220 A1* | 11/2012 | Snoeck | E01C 23/07 404/75 |
| 2014/0324291 A1* | 10/2014 | Jones | G05D 1/0278 701/41 |
| 2017/0313303 A1* | 11/2017 | Valtanen | G05D 1/0891 |
| 2020/0079443 A1* | 3/2020 | Sauvageau | B60C 23/005 |

* cited by examiner

INCLINATION CONTROL FOR CONSTRUCTION MACHINES

CLAIM OF PRIORITY

This application claims the benefit of priority to U.S. Provisional Application Ser. No. 62/749,571, filed on Oct. 23, 2018, which is incorporated herein by reference in its entirety.

TECHNICAL FIELD

The present disclosure generally relates to the field of construction. More particularly, the present disclosure relates to systems and methods of inclination control for construction machines.

BACKGROUND

Cold planer machines and rotary mixer machines can be used to remove old or degraded pavement from surfaces such as roadways and parking lots. These and other construction machines can traverse uneven terrain causing tilting of the construction machine which can affect performance.

U.S. Pat. No. 9,879,390 to Berning et al., entitled "Road Milling Machine and Method for Measuring the Milling Depth," discloses a method for "measuring the milling depth of a road milling machine."

SUMMARY OF THE INVENTION

To summarize at least a portion of the disclosure, a non-limiting list of examples is provided here:

In one aspect, the present disclosure relates to a system including a first transportation device, a controller, and an inclination control system. The first transportation device may move a construction machine over an operating surface. The controller may control the construction machine including the first transportation device. The inclination control system includes a first slope sensor coupled to the first transportation device and a second slope sensor coupled to the construction machine. The controller may control the construction machine based on inclination information received from the inclination control system.

In another aspect, the present disclosure relates to a method of controlling inclination of a construction machine. The method includes collecting at a first slope sensor, position or orientation information related to a first transportation device of a construction machine. The method further includes collecting, at a second slope sensor, position or orientation information related to a portion of the construction machine. The method also includes determining an inclination measurement of the construction machine relative to an operating surface based on the position or orientation information from the first and second slope sensors. The method further includes extending or retracting a first lifting column based on the inclination measurement.

In another aspect, the present disclosure relates to a system including a first slope sensor, a second slope sensor, a plurality of transportation devices, and a controller. The first slope sensor is coupled to a construction machine at a first location. The second slope sensor is coupled to the construction machine at a second location. The controller may manipulate a first transportation device of the plurality of transportation devices based on a comparison of information received from the first and second slope sensors.

These and other examples and features of the present devices, systems, and methods will be set forth in part in the following Detailed Description. This overview is intended to provide a summary of subject matter of the present patent application. It is not intended to provide an exclusive or exhaustive removal of the invention. The detailed description is included to provide further information about the present patent application.

BRIEF DESCRIPTION OF THE DRAWINGS

The drawings illustrate generally, by way of example, but not by way of limitation, various embodiments discussed in the present document.

DETAILED DESCRIPTION

An inclination control system may include a one or more slope sensors positioned on a construction machine to determine the inclination of the construction machine. The slope sensors may be positioned on the tracks of transportation devices of the construction machine, and in some examples, on the chassis or frame of the construction machine. The slope sensor on the track of the transportation device may indicate an angle or position of the track, which may be used to determine whether the frame of the construction machine is parallel to the operating surface. In some examples, one or more track sensors may be used with one or more slope sensors positioned on the frame of the construction machine to indicate the angle of the construction machine relative to the operating surface. The inclination control system allows a controller to maintain the frame of the construction machine parallel to the operating surface (or to a predetermined offset angle relative to the operating surface) by adjusting the lifting columns of the transportation devices based on the information received from the inclination control system.

For the purposes of this disclosure, a slope sensor means any sensor that can be used (alone or in combination with other slope sensors or information) to determine an orientation or angle of the frame of the construction machine relative to an operating surface, for example, sensors that measure slope, angle sensors, linear sensors (including magnetoresistive sensors, laser sensors, string potentiometers, etc.), rotary angle position sensors, inertial measurement units (IMUs), single axis sensors, multiple axis sensors, six degree of freedom (6DoF) sensors, optical sensors (including smart cameras, etc), a combination of these or the like. The use of the inclination control system allows for more precise control of the construction machine to maintain the frame of the construction machine parallel to the operating surface (or at a predetermined offset).

Figure 1:
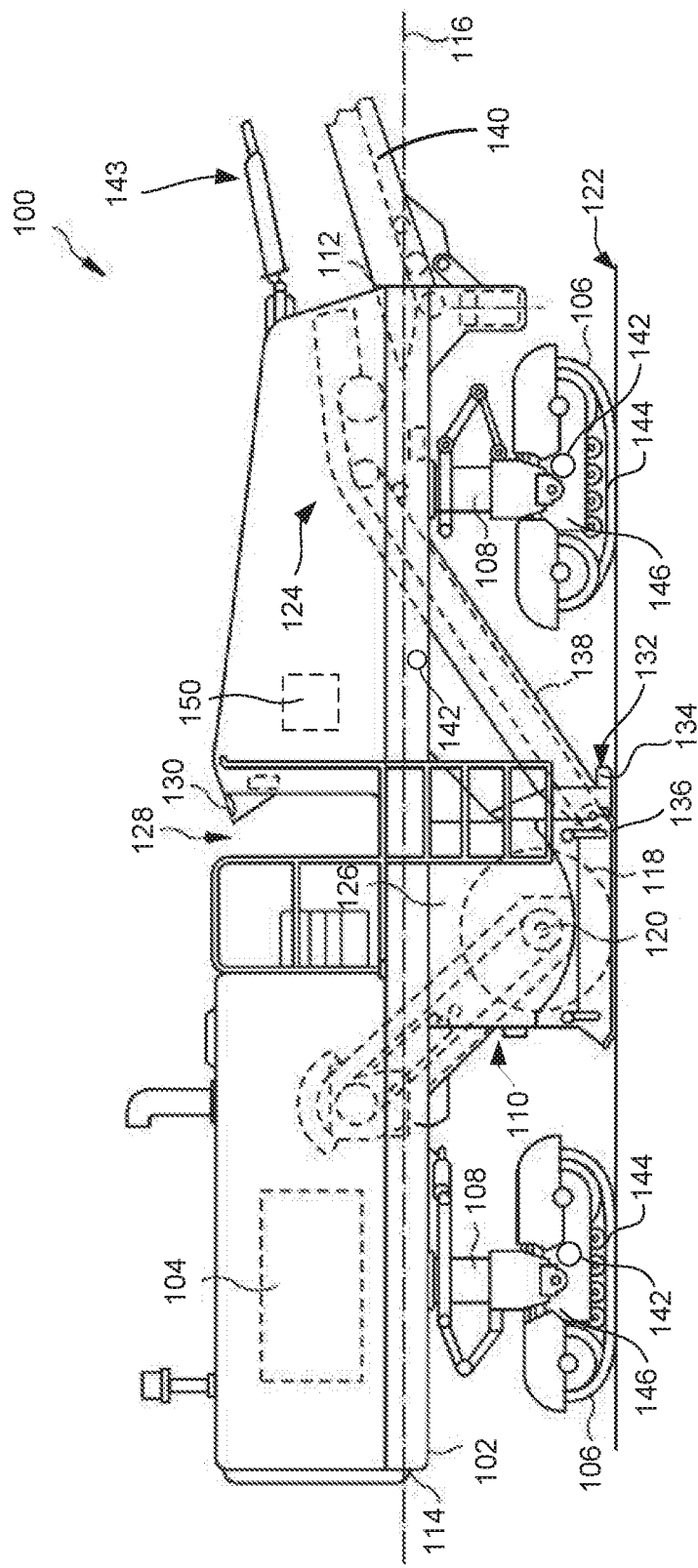
FIG. 1 is a side view of a construction machine including an inclination control system, in accordance with at least one example.

FIG. 1 is a side view of a construction machine 100, which in the illustrated example is a cold planer machine. The cold planer machine 100 includes a frame 102 to which a power source 104 and transportation devices 106 can be connected. Transportation devices 106 can be connected to the frame 102 via lifting columns 108. In at least one example, the transportation devices 106 can include the lifting columns 108, such that controlling the transportation devices 106 can include controlling the lifting columns 108. A milling assembly 110 can, for example, be coupled to the underside of the frame 102 between the transportation devices 106.

The frame 102 longitudinally extends between a first (e.g., front) end 112 and a second (e.g., rear) end 114 along a frame axis 116. The power source 104 can be provided in any number of different forms including, but not limited to, Otto and Diesel cycle internal combustion engines, electric motors, hybrid engines and the like. Power from the power source 104 can be transmitted to various components and systems of machine 100, such as the transportation devices 106 and a milling drum 118.

The frame 102 can be supported by the transportation devices 106 via lifting columns 108. Each of the transportation devices 106 can be any kind of ground-engaging device that allows the cold planer machine 100 to move over a ground surface, for example a paved road or a ground already processed by the cold planer machine 100. In the illustrated example, the transportation devices 106 are configured as track assemblies, each of which includes a track 144 and a track frame 146 around which the track 144 rotates. The transportation devices 106 can be configured to move the cold planer machine 100 in forward and backward directions along the ground surface in the direction of the axis 116. The lifting columns 108 can be configured to raise and lower the frame 102 relative to the transportation devices 106 and the ground.

The milling assembly 110 can include the rotatable milling drum 118 operatively connected to the power source 104. The milling drum 118 can include a plurality of cutting tools, such as chisels, disposed thereon. The milling drum 118 can be rotated about a drum or housing axis 120 extending in a direction perpendicular to the frame axis 116 into the plane of FIG. 1. As the rotatable milling drum 118 spins or rotates about the drum axis 120, the cutting tools may engage hardened materials 122, such as, for example, asphalt and concrete, of existing roadways, bridges, parking lots and the like. Moreover, as the cutting tools engage such hardened materials 122, the cutting tools remove layers of these hardened materials 122. The spinning action of the rotatable drum 118 and its cutting tools can then transfer the hardened materials 122 to a conveyor system 124.

The milling assembly 110 can further include a drum housing 126 forming a chamber for accommodating the milling drum 118. The drum housing 126 can include front and rear walls, and a top cover positioned above the milling drum 118. Furthermore, the drum housing 126 can include lateral covers, or side plates, on the left and right sides of the milling drum 118 with respect to a travel direction of the cold planer machine 100. The drum housing 126 can be open toward the ground so that the milling drum 118 can engage the ground from the drum housing 126. Furthermore, the drum housing 126 can be removed from the frame 102 for maintenance, repair and transport.

The cold planer machine 100 can further include an operator station or platform 128 including an operator interface 130 for inputting commands to a controller 150 for controlling the cold planer machine 100, and for outputting information related to an operation of the cold planer machine 100. As such, an operator of the cold planer machine 100 can perform control and monitoring functions of the cold planer machine 100 from the platform 128, such as by observing various data output by sensors located on the cold planer machine 100. Furthermore, the operator interface 130 can include controls for operating the transportation devices 106 and the lifting columns 108.

An anti-slabbing system 132 can be coupled to the drum housing 126 and can include an upwardly oriented base plate (not visible in FIG. 1) extending across a front side of the cutting chamber, a forwardly projecting plow 134 for pushing loose material lying upon the hardened materials 122, and a plurality of skids 136. The conveyor system 124 can include a primary conveyor 138 and a secondary conveyor 140. The primary conveyor 138 can be positioned forward of the milling drum 118 and can be coupled to and supported upon the base plate of the anti-slabbing system 132. The primary conveyor 138 can feed material cut from the hardened materials 122 via the milling drum 118 to the secondary conveyor 140 projecting forward of the frame end 112. A positioning mechanism 143 can be coupled to the secondary conveyor 140, to enable left, right, up and down position control of the secondary conveyor 140. The secondary conveyor 140 can deposit removed hardened materials 122 into a receptacle, such as the box of a dump truck.

The cold planer machine 100 can include further components not shown in the drawings, which are not described in further detail herein. For example, the cold planer machine 100 can further include a fuel tank, a cooling system, a milling fluid spray system, various kinds of circuitry, etc. Additionally, although the present application is described with reference to a cold planer machine including a milling drum, the present invention is applicable to other types of construction machines.

The cold planer machine 100 can drive over the hardened materials 122 such that the front transportation devices 106 roll over the hardened materials 122. The cold planer machine 100 can be configured to remove the hardened materials 122 from a roadway to leave a planed surface behind. In some examples, the rear transportation devices 106 can roll on the planed surface, with the milling assembly 110 producing an edge of the hardened material 122 between milled and un-milled surfaces of the hardened material 122. The milled surface can include a surface from which paving material has been completely removed or a surface of paving material from which an upper-most layer of paving material has been removed, or a surface comprising material mixed by the milling assembly 110.

The cold planer machine 100 can be configured to travel in a forward direction (from left to right with reference to FIG. 1) to remove the hardened materials 122. The anti-slabbing system 132 can travel over the top of the hardened materials 122 to prevent or inhibit the hardened materials 122 from becoming prematurely dislodged during operations for removal of the hardened materials 122. The milling drum 118 can follow behind the anti-slabbing system 132 to engage the hardened materials 122. The Milling drum 118 can be configured to rotate counter-clockwise with reference to FIG. 1 such that material of the hardened materials 122 can be uplifted and broken up into small pieces by cutting teeth or chisels of the milling drum 118. The anti-slabbing system 132 can be configured to contain pieces of the hardened materials 122 within the drum housing 126. Removed pieces of the hardened materials 122 can be pushed up the primary conveyor 138 and carried forward, such as by an endless belt, to the secondary conveyor 140. The secondary conveyor 140 can be cantilevered forward of the front frame end 112 to be positioned over a collection vessel, such as the box of a dump truck. While the illustrated example is described with reference to an up cutting machine, the present teachings are applicable to a down cutting machine as well.

During the course of moving over the hardened materials 122, the transportation devices 106 can encounter obstacles, protrusions, or slopes which are rolled over by the transportation devices 106. Such obstacles, protrusions, or slopes can cause the cold planer machine 100 to tilt in one or more directions. In at least one example, the construction machine 100 can include an inclination control system to determine inclination of the construction machine 100 such that the controller 150 can control the construction machine 100 to compensate for the inclination.

The inclination control system includes a plurality of slope sensors 142 coupled to the constructions machine 100 to gather information related to forward-aftward tilting (pitch), side-to-side tilting (roll), or both, of the construction machine 100. In some examples, one or more of the plurality of slope sensors 142 can be positioned on one or more of the transportation devices 106, for example on the track frame 146 to gather information related to the position or orientation of the transportation device 106. In some examples, one or more of the plurality of slope sensors 142 can be positioned on the frame 102 or another portion of the construction machine 100 to gather information about the position or orientation of the construction machine 100. In some examples, information from each of two or more slope sensors 142 can be compared to determine an orientation of the construction machine 100. In at least one example, one or more slope sensors 142 positioned on a transportation device 106 is used in conjunction with one or more slope sensors 142 positioned on the frame 102 of the construction machine 100, such that the information from these sensors can be compared to determine a position or orientation of the construction machine 100 relative to the cut plane (the operating surface), and to use this information to adjust the construction machine 100 to maintain the frame 102 of the machine parallel to the cut plane. In at least one example, the controller 150 adjusts the construction machine 100 to maintain the frame 102 parallel to the track of the transportation device 146. In some examples, the operator may choose to operate the construction machine 100 at an incline or a decline, in which case the inclination control system can be used to maintain the frame 102 of the construction machine 100 at a predetermined offset from parallel to the operating surface. In at least one example, the inclination control system only requires one sensor (rather than a plurality) positioned on a single transportation device to control inclination of the construction machine 100.

The controller 150 can use information from the plurality of sensors 142 in conjunction with other machine information, for example steering data, to control tilting or inclination of the cold planar machine 100 relative to the operating surface. In at least one example, the plurality of sensors 142 can be used to control the cut plane of the milling drum 118 by controlling the orientation of the milling drum 118. In at least one example, the plurality of sensors 142 can be used to keep the cold planer machine 100 level for cutting. In at least one example, the controller 150 uses the inclination information (based on the slope sensors) to adjust e.g., extend or retract) one or more of the lifting columns 108. In at least one example, the inclination control system including the plurality of sensors 142 can be used to control the stability of the construction machine 100 when moving over a bump or other obstacle or when moving between surfaces of different heights.

Figure 2:
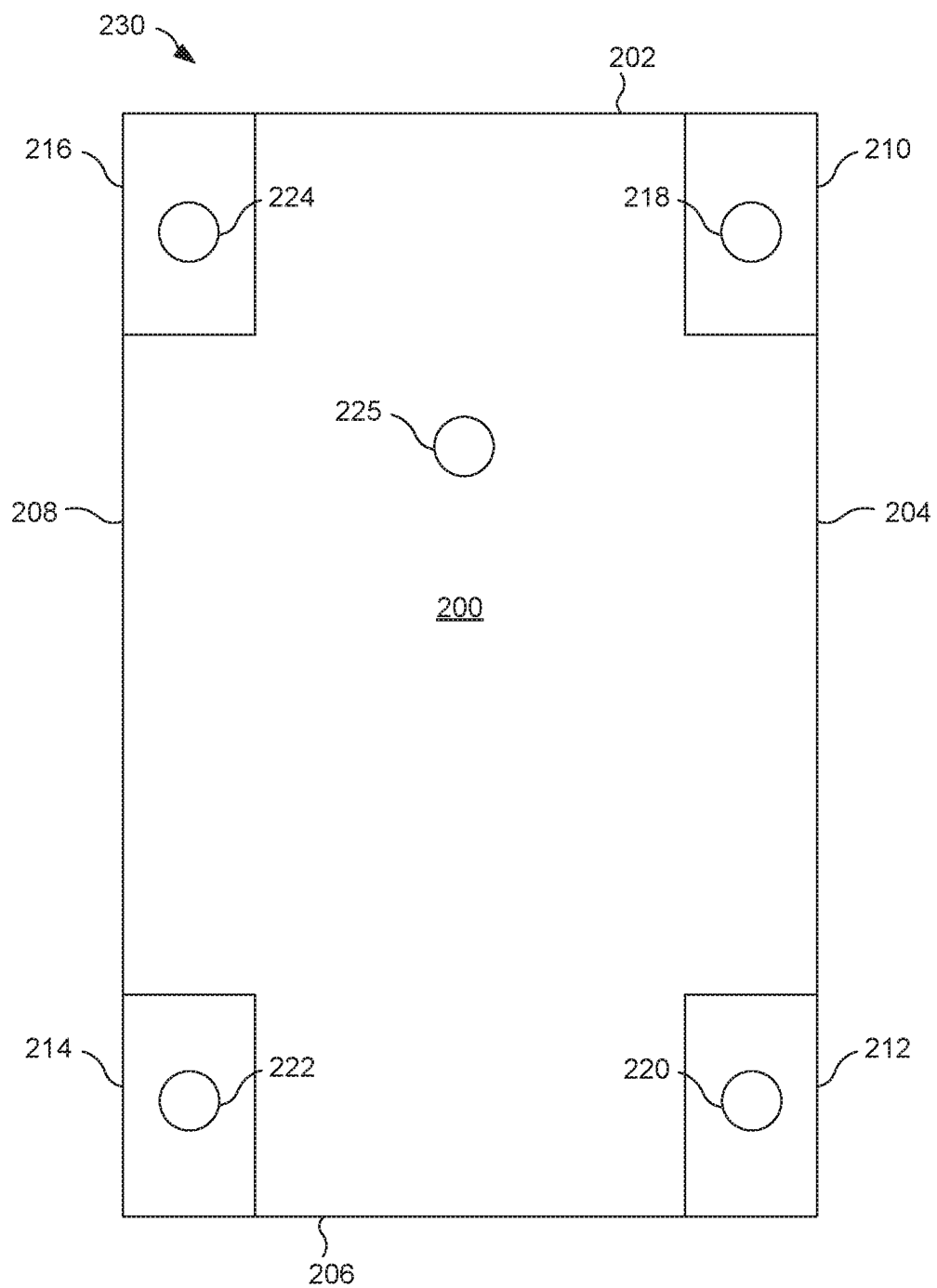
FIG. 2 is a diagrammatic plan view of a construction machine including an inclination control system, in accordance with at least one example.

FIG. 2 is a diagrammatic plan view of a construction machine 200 including an inclination control system 230, in accordance with at least one example. The construction machine 200 includes a front end 202, a right side 204, a rear end 206, and a left side 208. The construction machine 200 further includes a right front transportation device 210, a right rear transportation device 212, a left rear transportation device 214, and a left front transportation device 216. The inclination control system 230 includes a plurality of slope sensors 218, 220, 222, 224, 225 coupled to the construction machine 200. In the illustrated example, a plurality of slope sensors 218, 220, 222, 224 are shown positioned on the transportation devices 210, 212, 214, 216. However, the inclination control system 230 can include more or less slope sensors than those shown.

In some examples, the inclination control system 230 can include multiple slope sensors 218, 220, 222, 224, 225 per transportation device 210, 212, 214, 216 or other portion of the construction machine 200 (e.g., the frame). In at least one example, one or more of the slope sensors 218, 220, 222, 224, 225 is a single axis sensor. In at least one example, the inclination control system 230 does not require two slope sensors on each side. In at least one example, the inclination control system 230 only requires one of the slope sensors 218, 224 at the front end 202 of the construction machine 200, and one of the slope sensors 220, 222 at the rear end 206 of the construction machine 200. In another example, the inclination control system 230 only requires one of the slope sensors 222, 224 on the left side 208 and one of the slope sensors 210, 212 on the right side 204. In at least one example, the inclination control system 230 only includes slope sensors on the front transportation devices 210, 216. In another example, the inclination control system 230 only includes slope sensors on the rear transportation devices 212, 214. In another example, the inclination control system 230 only includes slope sensors on the right side transportation devices 210, 212. In another example, the inclination control system 230 only includes slope sensors on the left side transportation devices 214, 216. In at least one example the inclination control system 230 only includes a single slope sensor positioned on a single transportation device. In any of these examples, one or more slope sensors 225 may be positioned on the construction machine 200 other than on a transportation device 210, 212, 214, 216, for example on a frame or chassis of the construction machine 200.

In some examples the inclination control system 230 only detects and corrects for side-to-side tilt or roll. In some examples, the inclination control system 230 only detects and corrects for forward-aftward tilt or pitch. In some examples, the inclination control system 230 detects and corrects forward-aftward tilt (pitch) and side-to-side tilt (roll). In some examples, the inclination control system 230 detects and corrects for any deviation from parallel to the cut plane. For example, if the frame of the construction machine 200 is not parallel to the cut plane, the inclination control system 230 will detect this and correct the construction machine such that the frame is parallel to the cut plane. In at least one example, the inclination control system 230 uses geographical data of the operating surface to keep the frame parallel to the cut plane. In at least one example, the inclination control system 230 detects and corrects in real time. For example, the inclination control system 230 can detect and control the orientation of the construction machine 200 relative to the cut plane to provide the desired cut, to provide an even cut, to provide a smooth ride for the operator, to avoid tipping of the machine, to avoid other unfavorable operational conditions of the construction machine 200, a combination of these, or the like.

In at least one example, one or more of the slope sensors is a dual-axis sensor. In some examples, one or more of the slope sensors is a six degree of freedom (6DoF) sensor capable of measuring heave, sway, surge, roll, yaw, and pitch. In some examples, one or more of the slope sensors may include an accelerometer, a gyroscope, a magnetometer, a combination of these, or the like. In some examples, one or more of the slope sensors is a single axis sensor. In some examples, one or more of the sensors is an angle sensor or a linear sensor. In at least one example, at least two of the slope sensors are 6DoF sensors, while a slope sensor on the machine frame is not.

Figure 3:
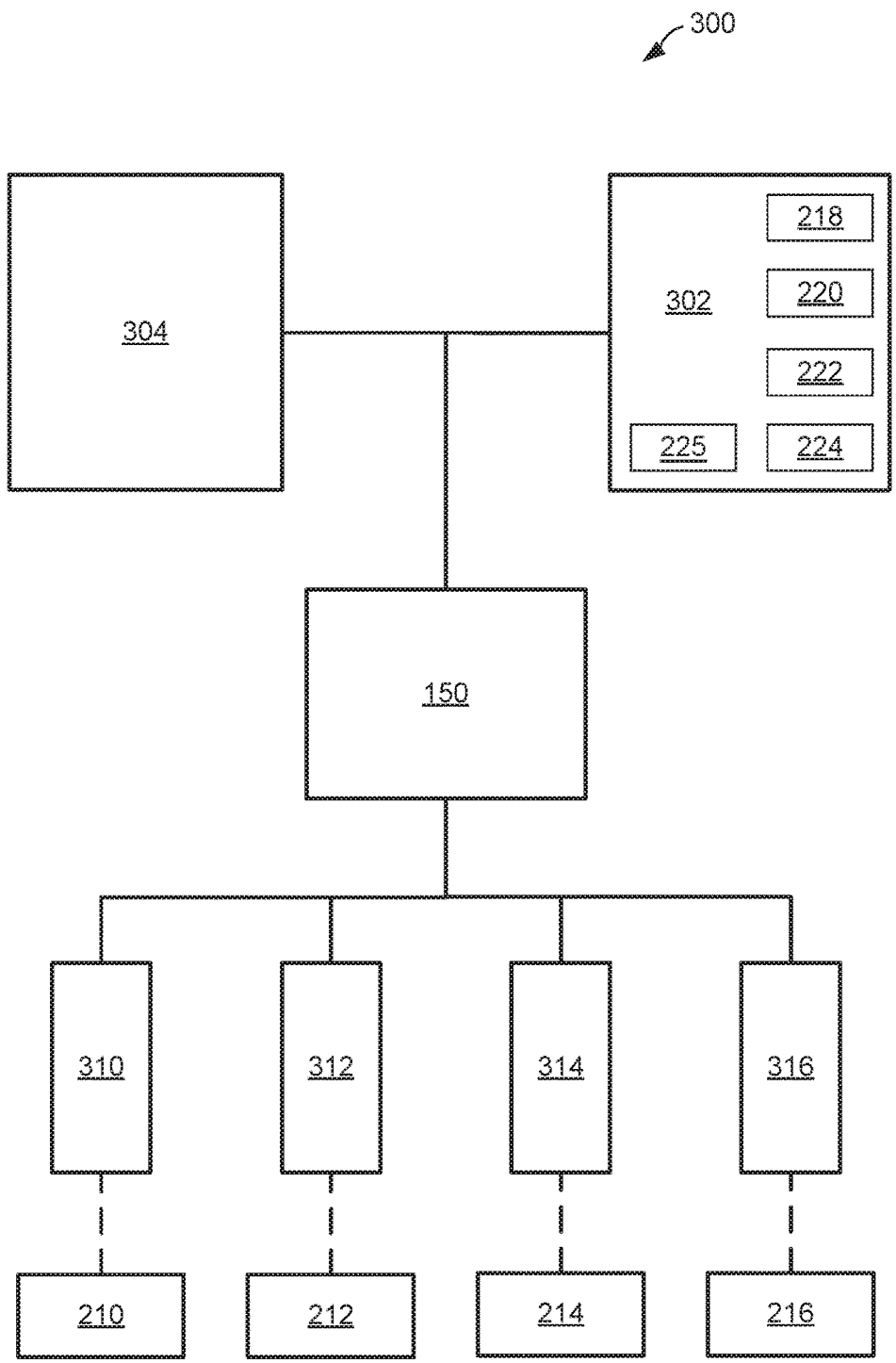
FIG. 3 is a schematic of a construction machine including an inclination control system, in accordance with at least one example.

FIG. 3 is a schematic of a construction machine 300 including an inclination control system 302, in accordance with at least one example. The inclination control system 302 includes the plurality of slope sensors 218, 220, 222, 224, 225. In at least one example, the controller 150 uses information received from the inclination control system 302 along with other machine information 304 to determine an inclination or tilt of the construction machine 300 (an inclination measurement). Machine information 304 can include, for example, steering data, machine specifications, threshold tilt values, worksite information, operating surface information, machine direction, machine speed, etc.

Based on the inclination measurement determined by the controller 150, the controller 150 adjusts (extends or retracts) one or more of the lifting columns 310, 312, 314, 316. Since each lifting column 310, 312, 314, 316 corresponds to a transportation device 210, 212, 214, 216 the controller 150 can identify and select the one or more lifting columns 310, 312, 314, 316 that need to be adjusted to correct the inclination or tilt of the construction machine 300. For example, if the inclination control system 302 indicates that the construction machine 300 is not parallel to the cut surface due to a side-to-side tilt such that the right side 204 is lower than the left side 208, the controller 150 can extend the right side lifting columns 310, 312 (corresponding to right side transportation devices 210, 212) to raise the right side 204 relative to the left side 208, or the controller 150 can retract the left side lifting columns 314, 316 (corresponding to left side traveling deices 214, 216) to lower the left side 208 relative to the right side 204.

Similarly, if the inclination control system 302 indicates that the construction machine 300 is not parallel to the cut surface due to a forward-aftward tilt such that the rear end 206 is higher than the front end 202, the controller 150 can extend the front end lifting columns 310, 316 (corresponding to front end transportation devices 210, 216) to raise the front end 202 relative to the rear end 206, or the controller 150 can retract the rear end lifting columns 312, 314 (corresponding to rear end transportation devices 212, 214) to lower the rear end 206 relative to the front end 202. In some examples, the inclination control system 302 may indicate tilts or inclinations in both the fore-aft and side-to-side directions. In at least one example, the inclination control system only corrects for forward-aftward tilt.

INDUSTRIAL APPLICABILITY

The present application describes various systems and methods for controlling inclination of a construction machine relative to an operating surface, for example, to control a cold planer machine to keep its frame parallel to the cut plane. Two or more slope sensors can be used as part of an inclination control system to identify tilting of the construction machine (e.g., forward-aftward). In at least one example, two or more six degree of freedom (6DoF) sensors are positioned on the construction machine so as to gather information indicative of the inclination of the construction machine relative to a cut plane. In some examples, at least four single axis sensors can be used to gather the relevant inclination information. In some examples, at least one linear sensor, IMU, rotary angular position sensor, or optical sensor can be used to gather the relevant inclination information. The inclination information from the inclination control system can be used with other machine information, such as steering information, to allow precise control of construction machine ground inclination. Optimization of the control of inclination relative to the operating surface results in better overall performance of the construction machine, including ride stability and level cutting.

What is claimed is:

1. A system, comprising:
first and second transportation devices configured to cooperate to move a construction machine over an operating surface;
a controller configured to control the construction machine including the first and second transportation devices; and
an inclination control system, including:
a first slope sensor coupled to the first transportation device;
a second slope sensor coupled to the second transportation device; and
a third slope sensor coupled to a frame of the construction machine, wherein each of the first and second slope sensors is a six degrees of freedom (6DoF) sensor wherein the controller is configured to;
determine an inclination measurement of the frame of the construction machine based on inclination information received from at least one of the first and second slope sensors; and
control the first or second transportation device to change the inclination measurement of the frame of the construction machine.

2. The system of claim 1, wherein the third slope sensor is not a six degrees of freedom (6DoF) sensor.

3. The system of claim 1, wherein the controller is further configured to:
determine that the inclination measurement exceeds a threshold tilt value; and
identify and select one or more transportation devices that can be adjusted to correct tilt of the machine such that a subsequent inclination measurement will not exceed the threshold tilt value.

4. The system of claim 1, further comprising:
a third transportation device, wherein the inclination control system further includes:
a fourth slope sensor coupled to the third transportation device;
wherein the third transportation device is configured to cooperate with the first and second transportation devices to move the construction machine over the operating surface.

5. The system of claim 4, further comprising:
a fourth transportation device, wherein the inclination control system further includes:
a fifth slope sensor coupled to the fourth transportation device:
wherein the fourth transportation device is configured to cooperate with the first, second, and third transportation devices to move the construction machine over the operating surface.

6. The system of claim 1, wherein:
the first slope sensor is positioned at a front of the construction machine;

the second slope sensor is positioned at a rear of the construction machine;

the first and second slope sensors are configured to indicated forward-aftward inclination of the frame of the construction machine; and the controller is configured to control the first or second transportation device to change the forward-aftward inclination of the frame of the construction machine.

7. The system of claim 5, wherein each of the fourth and fifth slope sensors is a six degrees of freedom (6DoF) sensors.

8. The system of claim 1, further comprising:
a first lifting column coupled to the first transportation device; and
a second lifting column coupled to the second transportation device;
wherein, the controller being configured to control the first or second transportation device includes that the controller is configured to control:
the first lifting column to raise or lower the frame of the construction machine relative to the first transportation device; and
the second lifting column to raise or lower the frame of the construction machine relative to the second transportation device.

9. A method for controlling inclination of a construction machine, comprising:
collecting, at an inclination control system, inclination information related to a frame of a construction machine, including:
collecting position or orientation information from a first slope sensor positioned on a first transportation device of the construction machine;
collecting position or orientation information from a second slope sensor positioned on a second transportation device of the construction machine; and
collecting position or orientation information from a third slope sensor positioned on the frame of the construction machine, wherein at least the first and second slope sensors are six degrees of freedom (6DoF) sensors;
determining, at a controller, a first inclination measurement of the construction machine relative to an operating surface based on the inclination information from the inclination control system;
extending or retracting at least a first lifting column based on the first inclination measurement; and
determining, at the controller, a second inclination measurement of the frame of the construction machine that is different than the first inclination measurement.

10. The method of claim 9, wherein collecting inclination information from the inclination control system further includes:
collecting position or orientation information from a fourth slope sensor positioned on a third transportation device of the construction machine; and
collecting position or orientation information from a fifth slope sensor positioned on a fourth transportation device of the construction machine;
wherein the fourth and fifth slope sensors are six degrees of freedom (6DoF) sensors.

11. The method of claim 9, wherein determining the inclination measurement includes comparing the position or orientation information of the first transportation device from the first slope sensor to the position or orientation of the frame of the construction machine from the third slope sensor.

12. The method of claim 11, further comprising:
extending or retracting the second lifting column based on the first inclination measurement of the construction machine.

13. The method of claim 9, wherein extending or retracting the first lifting column is further based on steering data.

14. The method of claim 9, further comprising:
maintaining the frame of the construction machine parallel to the operating surface as the first and second transportation devices cooperate to move the construction machine over the operating surface.

15. A system, comprising:
a cold planer including:
a frame;
a plurality of transportation devices configured to move the cold planer across an operating surface, each transportation device including a track and a lifting column; and
an inclination control system, the inclination control system including:
a first slope sensor coupled to a first transportation device of the plurality of transportation devices, the first slope sensor comprising a six degrees of freedom (6DoF) sensor and configured to indicate an orientation of the first transportation device;
a second slope sensor coupled to a second transportation device of the plurality of transportation devices, the second slope sensor comprising a six degrees of freedom (6DoF) sensor and configured to indicate an orientation of the second transportation device;
a third slope sensor coupled to the frame of the cold planer, the third slope sensor configured to indicate position or orientation information about the frame of the cold planer; and
a controller configured to control the lifting column corresponding to one or more of the plurality of transportation devices to control inclination of the cold planer based on information received from the first, second, and third slope sensor.

16. The system of claim 15,
wherein the controller is configured to control the inclination of the cold planer based on information received in real time from the first, second, or third slope sensors and steering data.

17. The system of claim 15, wherein the controller is further configured to:
determine a first inclination measurement based on the information received from the first, second, and third slope sensors, the inclination measurement corresponding to a tilt of the frame of the cold planer relative to the operating surface;
determine that the first inclination measurement exceeds a threshold tilt value;
identify and select one or more lifting columns that can be adjusted to correct the tilt of the frame of the cold planer;
determine a second inclination measurement based on information received from the first, second, and third slope sensors subsequent to adjustment of the one or more lifting columns; and
determine that the second inclination measurement does not exceed the threshold tilt value.

18. The system of claim 15, wherein the first slope sensor is an inertial measurement unit (IMU).

19. The system of claim 15, further comprising:
a fourth slope sensor coupled to a third transportation device of the plurality of transportation devices; and
a fifth slope sensor coupled to a fourth transportation device of the plurality of transportation devices;
wherein the controller is configured to control the plurality of transportation devices to adjust inclination of the cold planer based on information received from the first, second, third, fourth, or fifth slope sensors.

20. The system of claim 19,
wherein the controller is configured to control the plurality of transportation devices to adjust inclination of the cold planer based on a comparison of information received from the first, second, fourth, or fifth slope sensors associated with the plurality of transportation devices and the third slope sensor associated with the frame of the cold planer.

\* \* \* \* \*